United States Patent
Dykeman et al.

(10) Patent No.: US 9,317,571 B2
(45) Date of Patent: Apr. 19, 2016

(54) THIRD PARTY CONTENT PROVIDER INTEGRATIONS

(75) Inventors: Sean Dykeman, San Francisco, CA (US); Katherine Grace McGrath, Mountain View, CA (US); Richard William Bragg, Los Altos, CA (US); Gregory Allan Funk, San Francisco, CA (US); Peter J. Dolan, Los Gatos, CA (US); Jason Bayer, San Francisco, CA (US); Leslie Sandland, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/594,693

(22) Filed: Aug. 24, 2012

(65) Prior Publication Data

US 2015/0193433 A1 Jul. 9, 2015

Related U.S. Application Data

(60) Provisional application No. 61/528,021, filed on Aug. 26, 2011.

(51) Int. Cl.
*G06F 17/30* (2006.01)

(52) U.S. Cl.
CPC ...... *G06F 17/3056* (2013.01); *G06F 17/30023* (2013.01)

(58) Field of Classification Search
CPC .......... G06F 17/30286; G06F 17/3089; G06F 17/30241; G06Q 30/02; G06Q 30/0277; G06Q 30/0225
USPC ........................................ 707/721, 722, 723
See application file for complete search history.

(56) References Cited

U.S. PATENT DOCUMENTS

| | | | | |
|---|---|---|---|---|
| 8,694,533 B2* | 4/2014 | Oztaskent | | 707/769 |
| 2002/0087662 A1* | 7/2002 | Bouet | | G06F 17/30557 709/219 |
| 2003/0028890 A1* | 2/2003 | Swart | | H04N 7/17318 725/91 |
| 2006/0106874 A1* | 5/2006 | Victor | | G06F 17/30286 |
| 2008/0181536 A1* | 7/2008 | Linden | | H04M 1/72566 382/313 |
| 2009/0006542 A1* | 1/2009 | Feldman | | G06F 17/30053 709/203 |
| 2009/0119256 A1* | 5/2009 | Waters | | H04L 41/5064 |
| 2009/0199115 A1* | 8/2009 | Singh | | G06F 17/30994 715/764 |
| 2010/0036830 A1* | 2/2010 | Lee | | G06F 17/30967 707/708 |
| 2010/0174748 A1* | 7/2010 | Strumpf | | G06F 17/30286 707/780 |
| 2010/0250708 A1* | 9/2010 | Limberis | | G06F 17/30781 709/219 |
| 2011/0072052 A1* | 3/2011 | Skarin | | G06Q 10/10 707/794 |
| 2011/0154404 A1* | 6/2011 | Piepenbrink | | H04N 5/44543 725/53 |
| 2011/0161319 A1* | 6/2011 | Chunilal | | G06F 17/30867 707/733 |
| 2013/0339147 A1* | 12/2013 | Mysen | | G06Q 30/0256 705/14.54 |

\* cited by examiner

*Primary Examiner* — Hosain Alam
*Assistant Examiner* — Ahmed Abraham
(74) *Attorney, Agent, or Firm* — Morgan, Lewis & Bockius LLP

(57) ABSTRACT

A system, computer-readable storage medium storing at least one program, and a computer-implemented method for presenting media content information to a user is disclosed. A media search query is received from a user at a client device. A media content query is sent to a media information database. The media content query is at least partially based on the media search query. Media content information is received from the media information database. The information is associated with a plurality of content instances selected from a plurality of content types. The content instances satisfy the media search query and are selected only from content sources accessible to the client device. The media content information is presented to the user of the client device.

20 Claims, 8 Drawing Sheets

Media Content Query 400

| Device ID 402 | User ID 404 | Media Search Query Term(s) 406 | Accessible Content Source Identifiers 408 | Filter(s) 410 | ... |
|---|---|---|---|---|---|
| ### | User@xyz.com | "Seinfeld" | [Netflix, Basic Cable, Amazon] | [Genre, Video Quality, Content Type, Cost, Rating, etc.] | ... |

Figure 4

THIRD PARTY CONTENT PROVIDER INTEGRATIONS

RELATED APPLICATION

This application claims priority to U.S. Provisional Application Ser. No. 61/528,021, filed Aug. 26, 2011, entitled "Third Party Content Provider Integrations," which is incorporated by reference herein in its entirety.

TECHNICAL FIELD

The disclosed ideas relate generally to providing search results for media content instances in a media system.

BACKGROUND

Currently, consumers have access to numerous avenues for receiving video content. And while video content, such as television shows and movies, were traditionally only available from broadcast television channels or video stores, video content can now be downloaded and/or streamed directly to a user's television set whenever the user chooses. People are also increasingly storing larger collections of video content on home media servers and digital video recorders. But different content providers provide access to multimedia content in many different ways. Indeed, content providers offer access to media content using a variety of different technological and commercial models. With so many different media content providers and media content sources, it can be difficult for a user to know when and from what source desired media content is available. Further, some multimedia content, while technically available from a particular content source, will be inaccessible to users who do not have subscriptions to that source. Accordingly, it is highly desirable to provide systems and methods to provide media search functionality that helps a user easily locate desired and accessible content.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIG. 4 illustrates a media content query, according to some implementations.

DESCRIPTION OF EXAMPLE IMPLEMENTATIONS

Figure 1:
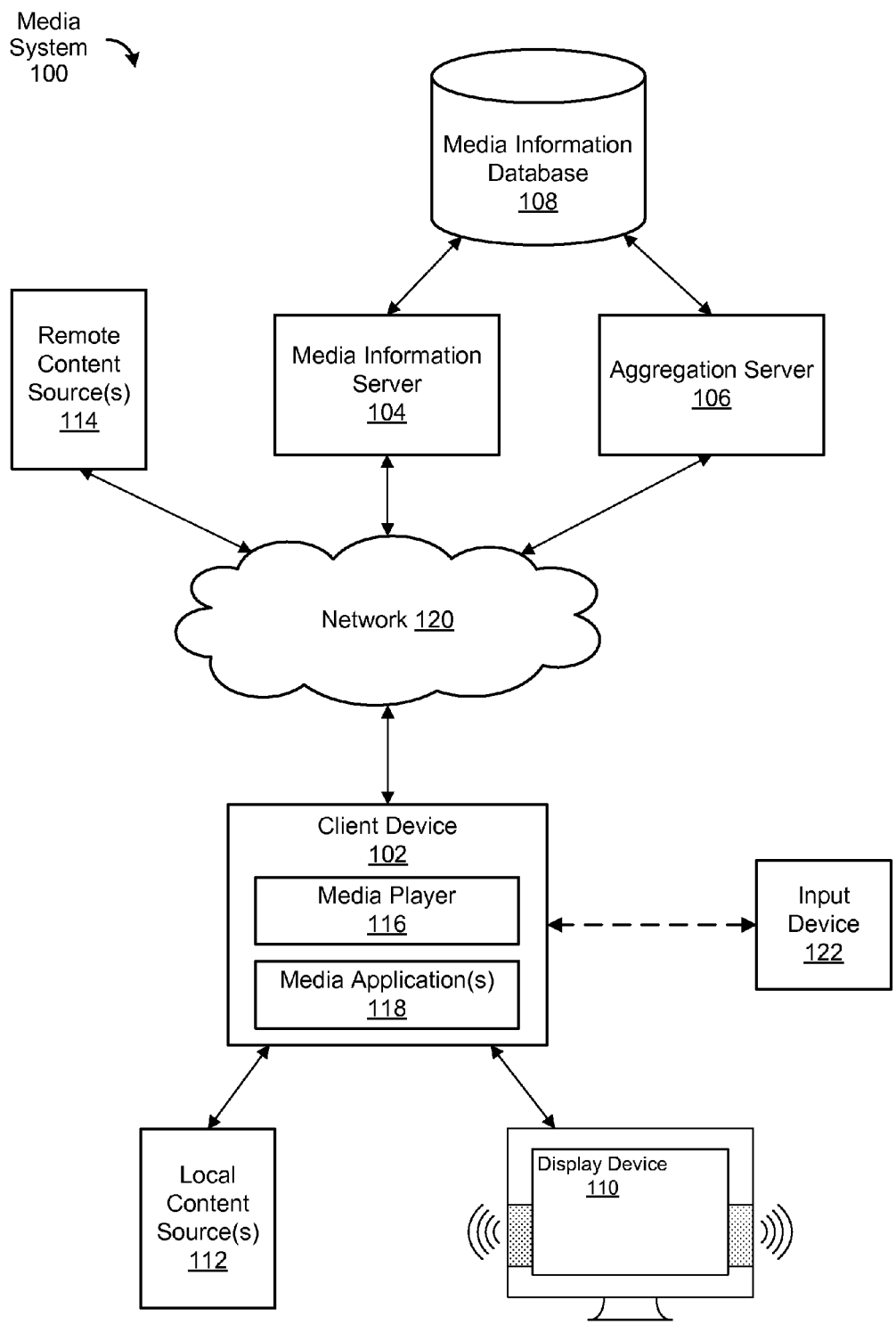
FIG. 1 is a block diagram illustrating a media system, according to some implementations.

FIG. 1 illustrates a media system 100. The media system 100 generally provides a unified system for cataloguing, searching, retrieving, and viewing media content instances from various discrete sources. The media system 100 includes a media information server 104 and a client device 102. The media information server 104 and an aggregation server 106 are coupled to a media information database 108. The client device 102 and the media information server 104 work in conjunction, as described in detail below, to provide search and user-interface functionality that is convenient and fast, and provides tailored results to a user. The media system 100 allows a user to perform keyword searches at the client device 102 that will return information about media content instances related to that keyword search. For example, users can search for specific media items by title (e.g., "The Godfather"), or can indirectly search for media items that match a general keyword, such as an actor's name, a genre, etc. Results are returned for display on the display device 110, including information about when and from what source matching media content instances are available. Often, media content instances will be available from a variety of different content sources. For example, the movie "The Godfather" may be available from a video-on-demand service, a streaming video "rental" service, a broadcast television channel, an online video-hosting website, or a user's home media server. Using an input device 122 (e.g., a dedicated remote control or a multi-purpose device with remote control capabilities) a user can select from the search results an instance of "The Godfather" for viewing on the display device 110. For example, a user may choose to pay to rent "The Godfather" for a limited period of time (e.g., a 24 or 48 hour rental), or may choose to watch an upcoming showing of "The Godfather" on a broadcast television channel to which the user has access.

Media content providers may use various types of media-access models, such as subscription models or discrete payment models. For example, a content provider may use a subscription model, where users pay for unlimited access to media content available from that provider. Some content providers alternatively use a pay-per-view model where users pay individually for each media content instance that they wish to access. Content providers may use these business models exclusively, or may use a combination of them. For example, a content provider may provide the different media access models at different prices, may offer an unlimited subscription plan as an alternative to a pay-per-view plan, or may offer a subscription plan with additional content on a pay-per-view basis.

Note that the term "content provider" is used to refer to an entity or a service that provides one or more content sources, and the term "content source" is used to refer to a source of instances of media items (e.g., a television channel, a radio channel, a web site, a streaming media service, etc.). In some implementations, a content source includes one or more of a digital video recorder, a satellite radio channel, an over-the-air radio channel, an over-the-air television channel, a satellite television channel, a cable television channel, a cable music channel, an Internet Protocol television channel, and a streaming media service (e.g., a video-on-demand service, a streaming video service, a streaming music service, etc.).

In some implementations, the media system 100 focuses on content sources that are accessible to a user (or to a client device associated with a user), and provides search results that include content from only those sources. Thus, the user can be assured that the search results do not contain content instances that are inaccessible, or are offered by services to which the user has not subscribed. Providing results from sources that are accessible to the client device (rather than all-inclusive results including content instances that are, for example, offered by service to which a user has not subscribed) also enables a cleaner user experience, as search results are not cluttered with inaccessible media content instances. As a specific example, the media information server 104 can store media content information about content instances available from a subscription service such as Netflix. Users who do not have a Netflix subscription, however, cannot access these content instances. The media system 100 thus includes search results from Netflix only if the user (or the client device 102) has or is associated with a Netflix subscription.

Returning to FIG. 1, the aggregation server 106 aggregates media content information from a variety of different content sources. Media content information includes information about when, and from what source, media content items are available for display at a user device. The aggregation server 106 is also coupled to a network 120, such as the Internet. In some implementations, the aggregation server 106 acquires media content information from remote content source(s) 114 via the network 120. Remote content sources are described in greater detail below.

The media information server 104 is coupled to the network 120, and communicates with the client device 102 to provide access to the media content information in the media information database 108. In some implementations, the media information server 104 receives media content queries from the client device 102 and returns media content information to the client device 102 for display on a display device.

The client device 102 is coupled to a display device 110. The display device 110 is any device, component, or combination of components for displaying media content (including audio-visual content) to a viewer, and includes LCD displays, plasma displays, projectors, televisions, etc. The client device 102 includes a media player 116 and one or more media applications 118. In some implementations, media applications 118 are associated with media content providers that allow a user to access and display audio-visual content through the display device 110. Media applications 118 include remote-content applications 426 and local-content applications 428, described in greater detail below. The media player 116 likewise enables display of audio-visual content through the display device 110. The media player 116 is configured to display media content of varying types and formats, and from various locations. In some implementations, the media player 116 accesses and displays content from local content sources, as described in greater detail below. In some implementations, the media player 116 accesses and displays media content from remote content sources, such as streaming content that is accessible at a network uniform resource indicator ("URI"). For example, in response to receiving a user selection of a movie from a content source associated with a provider such as Netflix, the media player 116 retrieves the movie content from the Netflix database using the URI of that particular movie. In some implementations, the media player 116 can handle a variety of different data formats, such as different container formats (e.g., MPEG, MPEG-2, MP4, AVI, WAV, etc.), and different audio or video codecs (e.g., H.264, WMV, DivX, etc.).

In some implementations, individual content sources or providers provide source-specific media applications 118 to be executed on the client device 102. Media applications 118 that are specific to one content source or content provider may include search and viewing functionality that is limited to the media content available from that source or provider. The media applications 118 may also include account management functionality. A Netflix application, for example, may allow a user to manage subscription options (e.g., payment information, account settings, user preferences, etc.), as well as search and view Netflix content directly from the Netflix application. In some implementations, the source-specific media applications do not have native media playing functionality, but instead rely on the native media player 116 of the client device 102.

The media search and media display functionalities described above can be integrated with one another in various ways. For example, media applications 118 can be integrated with a common, native search interface of the client device 102, or they can provide their own, separate search interfaces. Also, media applications 118 can be integrated with a native media player 116 of the client device 102, or they can provide their own, separate media players. For example, a cable TV provider such as Comcast may provide an application for execution by the client device 102 that provides a dedicated search function for channels that are accessible to the client device 102 (based on the user's cable subscription plan), and an interface for controlling a Comcast-provided DVR. However, the Comcast application may ultimately use the media player 116 of the client device 102 for displaying their content.

In some implementations, the client device 102 is coupled to one or more local content source(s) 112, such as DVRs, media servers, hard drives, etc. Local content source(s) 112 store local media content instances. As described in greater detail herein, in some implementations, the client device 102 catalogues and/or searches the contents of the local content source(s) 112 in order to include locally stored media instances in media search results.

Searching across local content sources 112 in addition to remote content sources 114 is particularly useful as personal media libraries are increasingly stored in media servers and DVRs. Users may not remember each and every movie or TV episode that they may have saved or recorded, and reading through a listing of all stored content items could be extremely cumbersome. In some implementations, the client device 102 can display media content stored on the local content sources 112. Thus, the media system 100 provides integrated search and display functions for media content instances from both local and remote sources.

Figure 2:
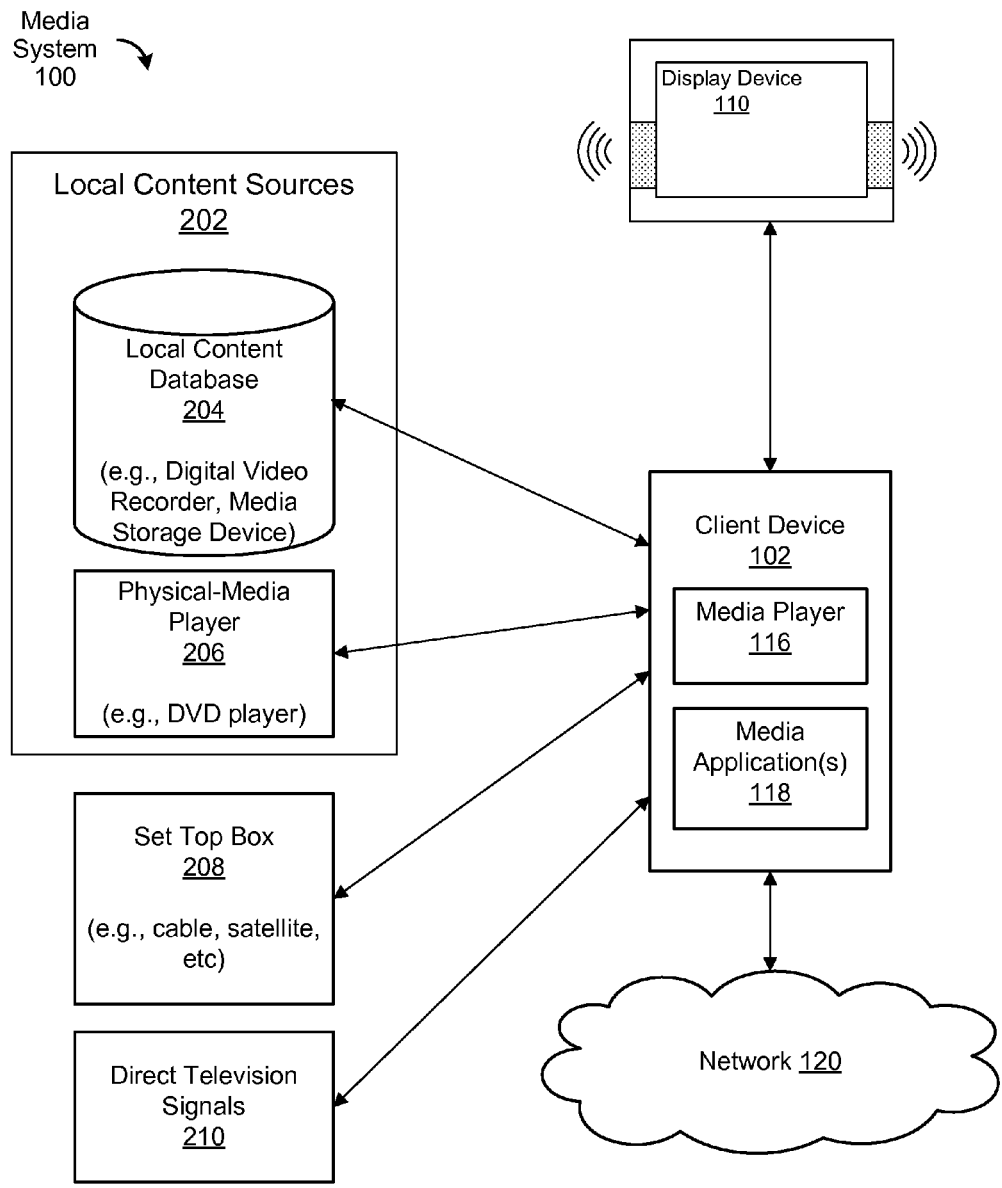
FIG. 2 is a block diagram illustrating a local portion of a media system, according to some implementations.

FIG. 2 is a block diagram illustrating additional details of a local portion of the media system 100. The client device 102 is coupled to the display device 110, and is locally coupled to additional media devices. As shown in FIG. 2, the client device 102 is coupled to a set top box 208, direct television signals 210, and local content sources 112. Local content sources 112 refer to devices, services, and/or components that store media content instances locally to the client device 102. Local content sources 112 can be hard-wired or wirelessly coupled to the client device 102, and do not require access to a remote content source or content provider in order to access their associated content. Examples of local content sources 112 include a local content database 204 and a physical-media player 206. The local content database 204 can be any storage device for locally storing media content instances for display by the display device 110, including DVRs, media storage devices, media servers, hard drives, computers, or any other device with memory capable of storing computer readable media files. The physical-media player 206 is a device for displaying traditional local media, such as DVDs or videocassettes.

The set top box 208 is a TV component that receives, decodes, and/or otherwise provides a TV signal for presentation on the display device 110, such as cable TV and/or satellite TV signals. In some implementations, the client device 102 interfaces with the set top box 208 in order to control functionalities of the set top box 208. For example, the client device 102 can issue remote-control type commands (e.g., via infrared communication), such as channel up/down, volume up/down, power on/off, etc.

The direct television signals 210 are cable or satellite TV signals that are directly coupled to the client device 102 (e.g., without being coupled to an intermediate set top box). In some implementations, the direct television signals 210 are over-the-air television signals that are received by an antenna coupled to the client device 102. In some implementations, the antenna is housed in or near the client device 102, while in others it is remote from the client device 102 (e.g., an outdoor aerial antenna). In some implementations, the client device 102 also includes any appropriate tuner components to enable access to cable, satellite, and/or over-the-air television channels. It should be noted that while the set top box 208 and the direct television signals 210 are shown as part of the local portion of the media system 100, the actual content sources associated with these components are considered remote content sources. In other words, media content is transmitted to the set top box 208 and the components for the direct television signals 210 from remote sources such as broadcast networks, cable television providers, etc.

While FIG. 2 shows the local content sources 112, the set top box 208 and the direct television signals 210 as separate components, this figure is intended more as a functional description of the various features which may be present in at the local portion of a media system 100 than as a structural schematic of the implementations described herein. One of skill in the art will understand that these components (as well as other components not explicitly described) can be implemented in various ways and in various combinations. For example, a set top box may include in a single housing a DVR, a DVD player, and antenna and tuning components for over-the-air television signals.

Figure 3:
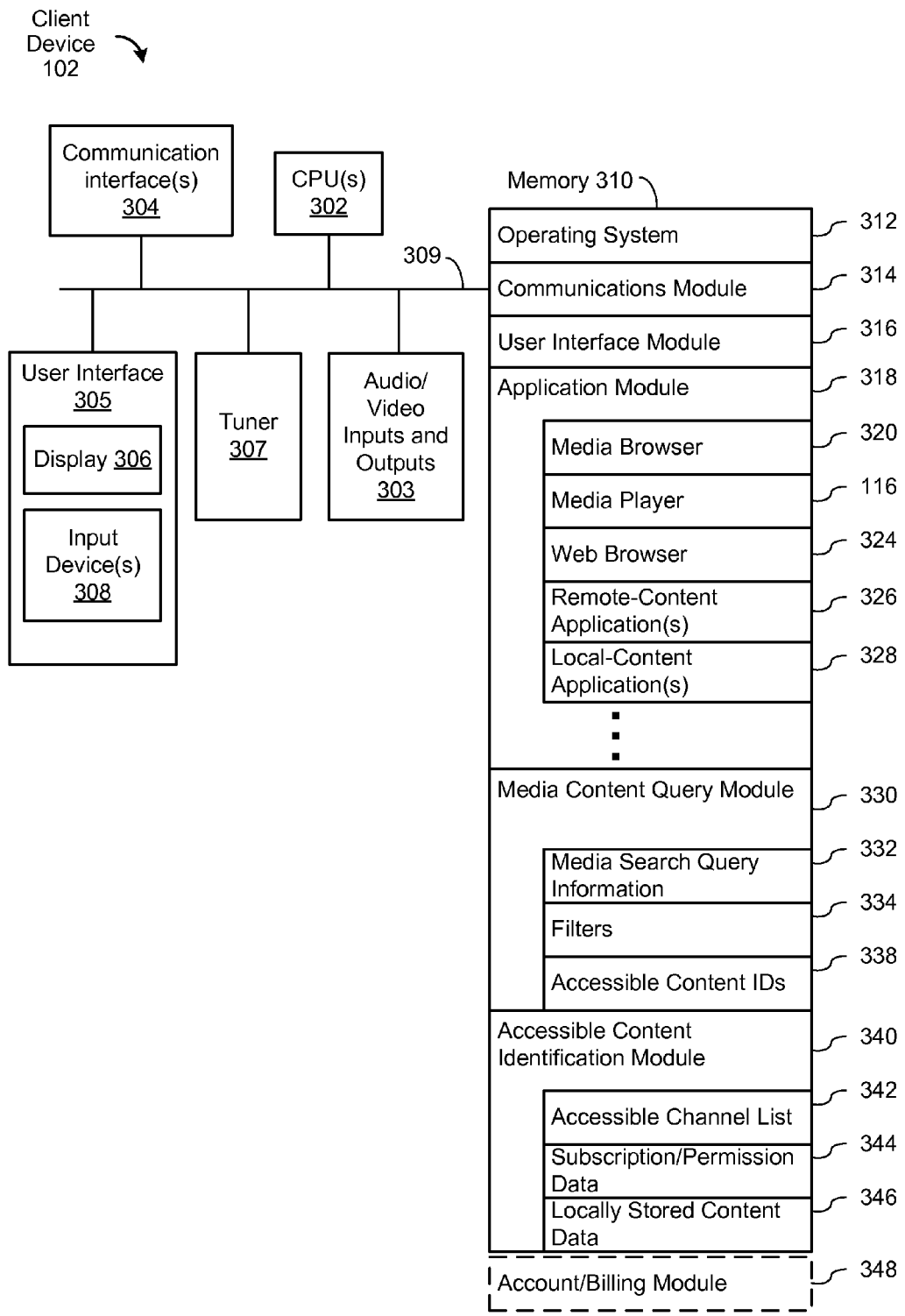
FIG. 3 is a block diagram illustrating a client device, according to some implementations.

FIG. 3 is a block diagram illustrating a client device 102, according to some implementations. The client device 102 typically includes one or more processing units (CPUs, sometimes called processors) 302 for executing programs (e.g., programs stored in memory 310), one or more network or other communications interfaces 304, memory 310, and one or more communication buses 309 for interconnecting these components. The communication buses 309 may include circuitry (sometimes called a chipset) that interconnects and controls communications between system components.

The client device 102 optionally includes a user interface 305 comprising a display 306 and input devices 308 (e.g., keyboard, mouse, touchscreen, keypads, etc.). In some implementations, the client device 102 is coupled to an external display (via the audio/visual inputs and outputs 303) such as the display device 110 of FIG. 1. In some implementations, the client device 102 is incorporated into (i.e., in the same housing as) the display 306. In some implementations, the client device 102 is incorporated into a portable electronic device, such as a mobile phone, tablet computer, laptop computer, etc. In some implementations, the user interface functionality, including search and selection of media content instances, is implemented on a first display, and the media content is displayed on a second display. For example, when the client device 102 is implemented as a set-top-box, a search and selection interface may be provided on a tablet computer, while the selected content is ultimately displayed on a separate TV screen.

In some implementations, the client device 102 includes a tuner 307 that is capable of receiving over-the-air TV signals. In some implementations, the tuner 307 receives other types of TV signals, such as cable, satellite, and/or internet TV signals. In some implementations, the tuner 307 is configured to receive analog and/or digital TV broadcasts.

In some implementations, the client device 102 includes audio/video inputs and outputs 303. Audio/video inputs and outputs 303 are physical interfaces for establishing connections between various components or devices of a local portion of the media system 100. For example, in some implementations, the audio/video inputs and outputs 303 include connectors for HDMI cables, coaxial cables, VGA cables, optical cables, and the like. In some implementations, the audio/video inputs and outputs 303 provide a physical interface between the client device 102, the local content sources 112, and the display device 110.

Memory 310 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 310 optionally includes one or more storage devices remotely located from the CPU(s) 302. Memory 310, or alternately the non-volatile memory device(s) within memory 310, comprises a non-transitory computer readable storage medium. In some implementations, memory 310 or the computer readable storage medium of memory 310 stores the following programs, modules, and data structures, or a subset thereof:

- an operating system 312 that includes procedures for handling various basic system services and for performing hardware dependent tasks;
- a communication module 314 that is used for connecting the client device 102 to other computers (e.g., the media information server 104) via the one or more communication interfaces 304 (wired or wireless) and one or more communication networks 120, such as the Internet, other wide area networks, local area networks, metropolitan area networks, and so on;
- a user interface module 316 that receives commands from the user via the input devices 308 and generates user interface objects in the display device 306, and/or a display device 110 coupled to the client device 102 via the audio/video inputs and outputs 303;
- an application module 318 that includes and is configured to execute one or more applications;
- a media content query module 330 that performs operations related to receiving user search queries and generating and issuing media content queries;
- an accessible content identification module 340 that identifies media content that is accessible to the client device 102; and
- an account/billing module 348 that stores and manages account and/or billing information for media content providers.

In some implementations, the application module 318 includes, and is configured to execute, one or more applications. In some implementations, the applications include a media browser 320, a media player 116, a web browser 324, and media applications 118 including remote-content applications 326 and local-content applications 328.

The media browser 320 allows a user to search, browse, and select media content instances for display. In some implementations, the media browser 320 provides a convenient graphical user interface for enabling these functions. In some implementations, the media browser 320 enables a user to enter search queries in a variety of different manners, such as by direct text input (e.g., through the input devices 308), or by selecting a graphical or textual item associated with a keyword or set of keywords. In some implementations, a user is presented with a list of selectable items, such as icons, pictures, text, screen shots, etc., that the user can select in order to request media content information about the subjects of the selectable items. Such items can be associated with any number of keywords. For example, a keyword associated with a screenshot of a movie could be one or more of the title of the depicted movie, an actor in the movie, a genre of the movie, etc. Where textual items are presented for selection, the keyword may be the same as the presented text. For example, the selectable text item of "comedy" can be associated with a genre keyword for comedy. Generally, the media browser 320 provides an interface with which a user can access the media system's search functionality as described in the present application. Thus, the media browser 320 includes user interface features that enable and assist a user to access media information items relating to when and from what source certain media content instances are available.

The media player 116 enables the client device 102 to display media content instances to a user via a display, such as a coupled external display (e.g., display device 110) or a native display 306 of the client device 102. In some implementations, the media player 116 can display various types of audio/visual content, including movies, television shows, music, audio books, etc. The media player can also display content from both remote content sources 114 and local content sources 112. In some implementations, the media player 116 integrates with other applications on the client device 102, so that those applications can leverage the native media playing capabilities provided by the media player 116.

The web browser 324 provides a graphical interface and associated processes to allow a user to browse the Internet. In some implementations, Internet-based media content can be selected through the web browser 324 for display by the media player 116.

The remote-content application(s) 326 allow a user to access and/or display remote audio-visual content through the display device 110. Remote-content applications 326 are associated with content sources that provide media streaming and/or download services to the client device 102. For example, content providers such as Netflix or Amazon Instant Video may offer an application for the client device 102 that allows a user to search and display that provider's content. Remote-content applications 326 may provide a user interface and media player different from that provided by the client device 102. In some implementations, however, remote-content applications use the media player 116 in order to display content from the associated remote-content source. In some implementations, the remote-content applications 326 handle payment and billing services for any media accessed by the client device 102 from a respective content source, even if the media is accessed through a separate application, such as the media player 116.

The local-content application(s) 328 are similar to the remote-content application(s) 326, but are configured to provide access to and/or display of locally stored media content. In some implementations, local-content applications 328 interface with a local content source 112, such as a local content database 204. For example, a DVR manufacturer may provide an application for execution by the client device, where the application allows a user to search and display content from the DVR, as well as manage DVR settings and functions.

The client device also includes a media content query module 330. The media content query module 330 receives media search queries from a user and generates a media content query 400 (FIG. 4) for transmission to a server (e.g., the media information server 104). As described above, a user can initiate a media content query in a variety of ways, including direct text input (e.g., by typing text into a search box), or by selecting an item associated with a keyword (e.g., clicking on or selecting a thumbnail of a movie's title picture). When a user initiates a search, the media content query module 330 determines media search query information 332 based on the user's input. For example, the media search query information can be (or an can be based on) the string of text input by the user into a search box, or the one or more keywords associated with a thumbnail of a movie (e.g., "The Godfather," "Drama," "Al Pacino").

In some implementations, the media content query module 330 includes one or more filters 334 for limiting the scope of results that are returned in response to the media content query. Filters 334 limit returned results based on possible categories or types of content. In some implementations, filters 334 limit returned results based on genre (e.g., comedy, drama), video quality level (e.g., high/standard definition), channel or network (e.g., channels 1-30, NBC, Comcast basic cable), content type (e.g., movie, TV episode, music), cost (e.g., free, under $5.00), time of airing (e.g., "in the next hour"), and rating (e.g., user rating, MPAA rating). Filters 334 include filters that are selected on a per-search basis, such as when results are to be limited only to "movies" for a single search. In some implementations, filters 334 also include persistent filters based on user preferences, device limitations, and the like. For example, filters 334 may include a persistent filter limiting results to standard definition content instances (for example, when a user does not have a high definition display device). Filters may also include settings such as parental controls, so that search results are limited to content satisfying certain age or rating restrictions (e.g., below TV-14 or PG-13). Filters may also be associated with individual users, so that different users of the client device 102 can have different persistent filers. For example, accounts associated with a child may have persistent rating filters enabled whereas accounts associated with an adult may have no rating restrictions.

In some implementations, the media content query module 330 includes accessible content IDs 338 for inclusion in the media content query. Accessible content IDs 338 are identifiers of content sources that are accessible to the client device 102. Search results that include content instances that are not accessible to the client device 102, for example because they are behind a paywall or are available by subscription only, can be annoying and can clutter search results. Accordingly, the media content query module 330 includes a list of accessible content IDs 338 so that the server can limit search results to accessible content instances. In some implementations, as described below, the client device 102 identifies content sources that are accessible to the client device 102, and provides IDs associated with those sources to the media content query module 330. In some implementations, a user manually identifies sources that are accessible to the client device 102.

In some implementations, the client device 102 includes an accessible content identification module 340 for identifying content sources that are accessible to a user. As described in greater detail below, information stored in conjunction with the accessible content identification module 340 is included in the media content query in order to advantageously limit search results to accessible content sources.

In some implementations, the accessible content identification module 340 includes subscription and permission data 344 for accessible content sources. In some implementations, the accessible content identification module 340 interacts with remote content applications 326 to determine whether a content source associated with respective media applications are accessible to the client device. For example, data associated with a Netflix application on the client device 102 may indicate that the user has an active Netflix subscription, and that Netflix content is therefore accessible.

In some implementations, the accessible content identification module 340 includes an accessible channel list 342. The accessible channel list 342 identifies those television channels that are accessible to the client device 102, including cable, satellite, and over-the-air television channels. In some implementations, the accessible content identification module 340 scans cable, satellite, and/or over-the-air signals to identify accessible TV channels. Where the client device 102 is used as a pass-through device for TV signals (e.g., when a cable box outputs video signals directly to the client device 102, which simply passes the video signals through to a display device), a user may be required to identify to the client device 102 the channels that are available to the user. For example, a user may indicate that he has a subscription to basic cable from a certain cable provider. The accessible content identification module 340 can then identify the channels that are available in that cable channel package by querying the media information server 104. The accessible content identification module 340 can also combine the list of over-the-air channels with the list of cable and/or satellite channels that are accessible, and store the information in the accessible channel list 342 for inclusion in a media content query. Accordingly, search results can be tailored to include media content instances on channels that are actually accessible to the client device 102, while excluding instances on inaccessible channels.

In some implementations, the accessible content identification module 340 includes locally stored content data 346. Locally stored content includes media content that is stored in a local content database 204, such as a DVR or media server coupled to the client device 102. In some implementations, the accessible content identification module 340 scans, indexes, and/or catalogues media content stored in the local content database 204. In some implementations, in response to a user's media search query, the media content query module 330 queries the locally stored content data 346 (or directly queries a local content source 112) to identify instances of locally stored content that satisfy the media content query in addition to querying the media information server 104.

In some implementations, client device 102 includes an account/billing module 348 that handles account and/or billing interactions for media content providers. The account/billing module 348 allows a user to store information relating to accounts and subscriptions, and interfaces with media content providers in order to enable direct receipt of media content instances to the client device 102 from the media content provider. For example, a user may store information associated with a Netflix account directly on the client device 102, which can then communicate directly with Netflix's servers to authorize the delivery of selected content instances. The account/billing module 348 can store information for multiple content providers, and can, therefore, support a single account management system for all of a user's media content subscriptions and accounts. Furthermore, in some implementations, the accessible content identification module 340 directly queries the account/billing module 348 to determine content sources that are accessible to the client device 102 based on the account and/or subscription information stored therein.

In some implementations, the programs or modules identified above correspond to sets instructions for performing a function described above. The sets of instructions can be executed by one or more processors (e.g., the CPUs 302). The above identified modules or programs (i.e., sets of instructions) need not be implemented as separate software programs, procedures, or modules, and thus various subsets of these programs or modules may be combined or otherwise re-arranged in various implementations. In some implementations, memory 310 stores a subset of the modules and data structures identified above. Furthermore, memory 310 may store additional modules and data structures not described above.

Although FIG. 3 shows a client device 102, FIG. 3 is intended more as a functional description of the various features which may be present in a client device 102 than as a structural schematic of the implementations described herein. In practice, and as recognized by those of ordinary skill in the art, items shown separately could be combined and some items could be separated. For example, some items shown separately in FIG. 3 could be implemented in single modules or data structures.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementations. In general, structures and functionality presented as separate components in the example configurations may be implemented as a combined structure or component. Similarly, structures and functionality presented as a single component may be implemented as separate components. These and other variations, modifications, additions, and improvements fall within the scope of the described implementations.

FIG. 4 is a block diagram illustrating a media content query 400. In some implementations, the media content query 400 is generated by the media content query module 330. The media content query 400 includes a device ID 402, a user ID 404, one or more media search query terms 406, accessible content source identifiers 408, and filter(s) 410. The device ID 402 is a unique identifier of the client device 102, such as a MAC address, IP address, or any other unique identifier. The device ID 402 serves to identify a specific client device 102 to a server (such as the media information server 104) receiving the media content query 400.

User ID 404 uniquely identifies the user of the client device 102. In some instances, a single client device 102 supports multiple user accounts, each having its own permissions, filters, preferences, etc.

Accessible content source identifiers 408 include identifiers of those content sources that are accessible to the client device 102. These identifiers are acquired from the accessible content source identification module 340.

Filters 410 include the filters described above with respect to FIG. 3. Namely the filters 410 serve to limit the scope of the returned search results based on a user's specific search filtering requests.

In some implementations, the media information server 104 stores information about individual users or devices so as to enable fast and efficient search functionality. For example, the media information server may store subscription/permission data for a client device 102, and/or content filters for various users of the client device 102. The device ID 402 and the user ID 404 can be used by the media information server 104 to uniquely identify the stored data and tailor search results based on that user's preferences. Furthermore, in implementations where the media information server 104 stores user- or device-specific information (such as filter settings or accessible content source identifiers) that are persistent or infrequently changed at the client device 102, it is not necessary for the client device to include such information in each media content query 400 sent to the media information database 108. Rather, the media information server 104 can perform a look-up to identify this information upon receiving a media content query 400 with a user ID 404 or device ID 402. In some implementations, such information is included in a media content query 400 only when there is a change in the accessible content or persistent filter settings.

The media content query 400 is described with reference to one example, but one of skill in the art will recognize that other examples of queries, including more, fewer, or different fields, are also possible without departing from the spirit of the present disclosure. For example, in some implementations, a media content query can exclude certain fields. For example, a media content query 400 can be generated without a media search query term 406, such that only the filters 410 limit the scope of search results. This can be used when a user wants to search among content instances based on a general category, such as a genre of movie, without including a keyword search.

Figure 5:
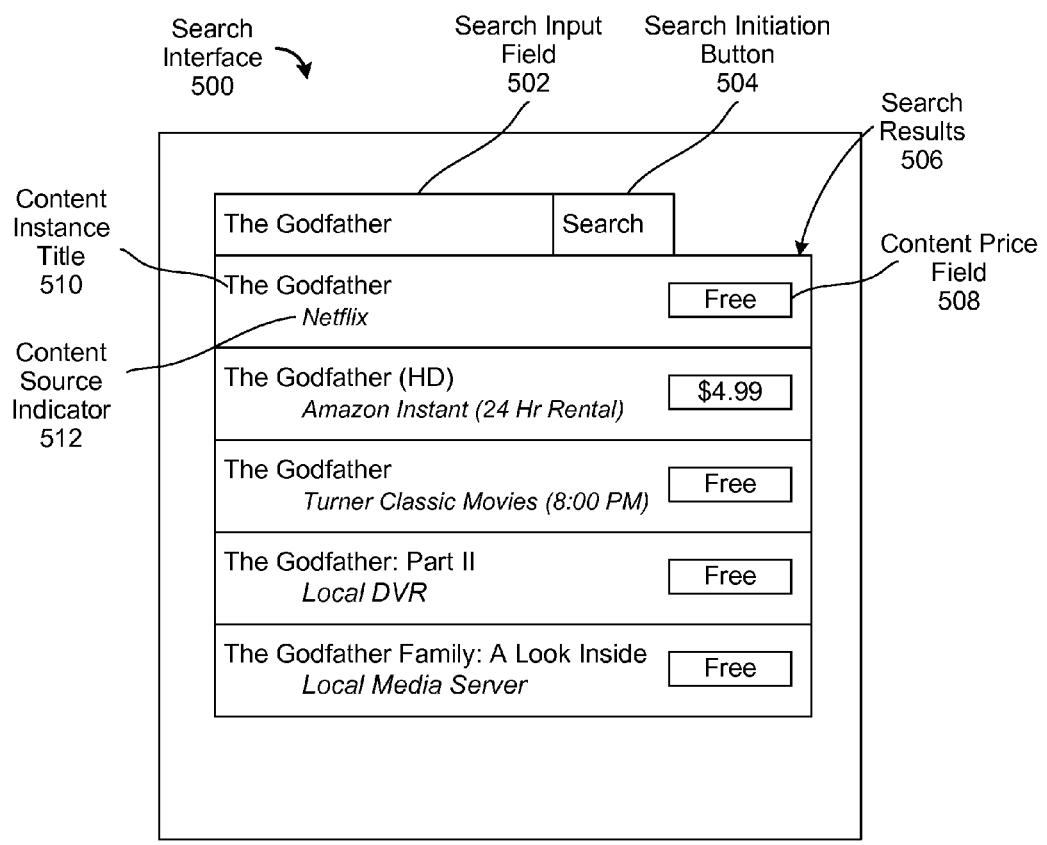
FIG. 5 illustrates an exemplary search interface, according to some implementations.

FIG. 5 illustrates a block diagram of an exemplary search query interface 500. The search query interface 500 is part of the user interface of the client device 102. The search query interface includes a search input field 502 and an optional search initiation button 504. A user can input text into the search input field 502 using an input device 308 such as a remote control, keyboard, touchscreen, etc. The text is received by the media content query module 330 as the media search query information 332. In some implementations, the media content query 400 can include media search query terms 406 that match, or are based on, the text entered in the search input field 502.

The optional search initiation button 504 can be selected by a user, through an input device 308, for example. In some implementations, the search initiation button 504 need not be selected in order to initiate a search. For example, the search may be initiated when a user selects a key or button on an input device 308, or automatically when the client system 102 perceives that a search string is complete. In some implementations, the search initiation button 504 is not included in the search query interface 500.

FIG. 5 also illustrates exemplary displayed search results 506. Search results 506 identify media content instances that are relevant to a media content query 400 based on the text from the search input field 502. In some implementations, search results include a content instance title 510, a content source indicator 512, and a content price field 508. The content instance title 510 indicates the title of an accessible media content instance. The content source indicator 512 indicates the content source from which the content is available. As shown, results 506 include content instances from remote sources (Netflix, Hulu Plus, Amazon Instant, Turner Classic Movies) as well as content instances from local sources (Local DVR, Local Media Server). Content price field 508 indicates the price associated with viewing that particular content instance. For example, FIG. 5 indicates that a 24 hour rental of "The Godfather" in high definition would cost $4.99 from Amazon Instant. As described above, some content sources, such as Netflix, use a subscription model, where content instances are accessible for no extra charge to users with subscriptions. Because the search results 506 include a result from Netflix, FIG. 5 demonstrates how search results may appear in implementations where Netflix is an accessible content source. If the client device 102 is not associated with a Netflix subscription, this search result would not be displayed.

Figure 6A:
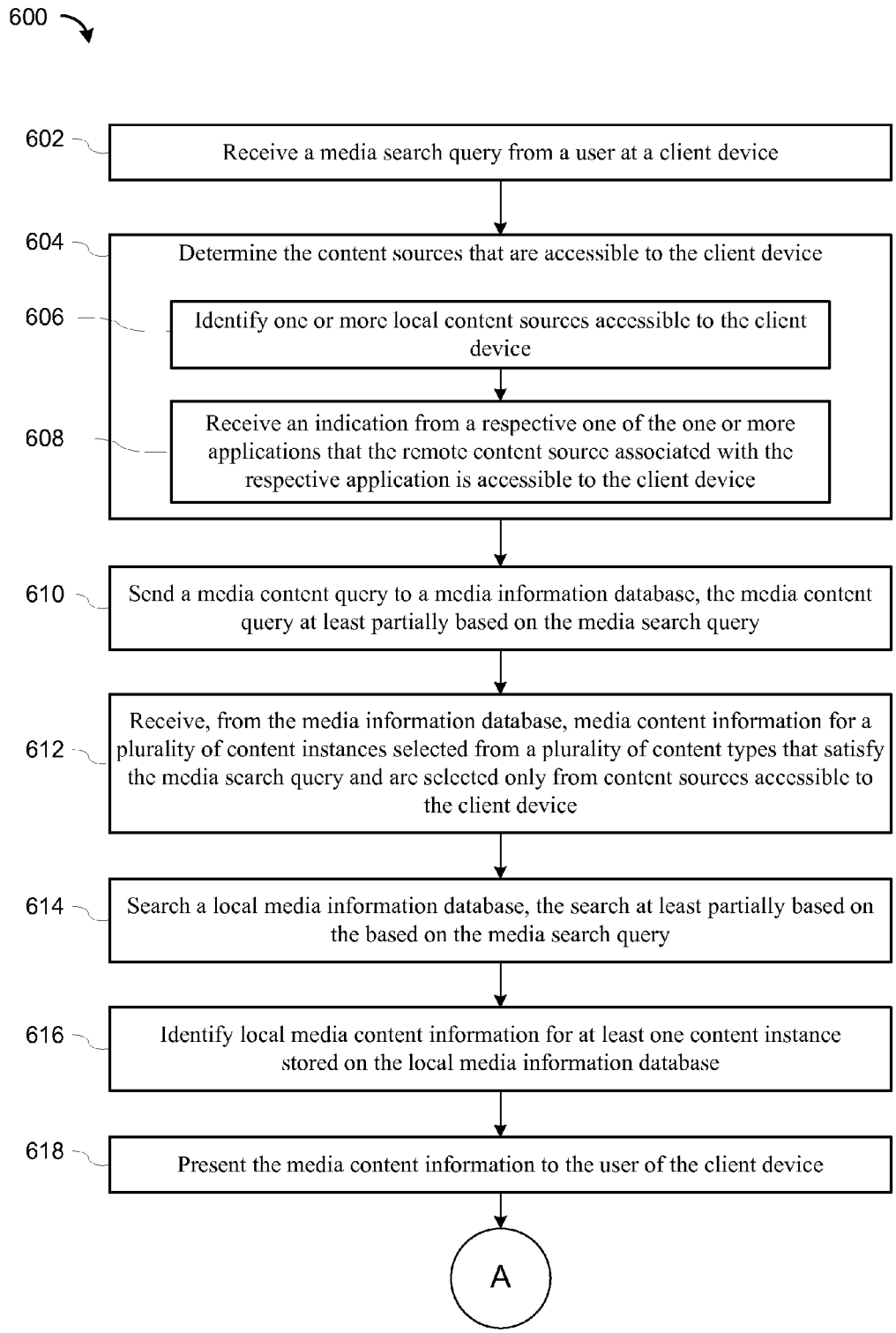
FIGS. 6A-B illustrate a flowchart of a method for presenting media content information, according to some implementations.

FIG. 6 is a flowchart representing a method 600 for presenting media content information, according to some implementations. The method 600 is performed at a client device 102 having at least one processor and memory. In some implementations, the method is performed by multiple devices, such as a set-top-box and a tablet computer.

In some implementations, the client device 102 receives a media search query from a user (602). The media search query can be input directly as text, or can be a selection of a contextual item such as an image, thumbnail, textual data, etc.

In some implementations, the client device 102 sends a media content query to a media information database, the media content query at least partially based on the media search query (610). In some implementations, the media content query includes information directly from (or based on) the media search query, such as search strings, keywords, filters, and the like. In some implementations, the media content query includes additional information as described above with reference to FIG. 4. The media information database can then generate a response based on the media content query.

In some implementations, the client device 102 receives, from the media information database, media content information for a plurality of content instances selected from a plurality of content types that satisfy the media search query and are selected only from content sources accessible to the client device (612). As described above, the media content information are selected from content sources to which the client device (or a user of the client device) has access, via subscription, or because the content source is accessible to anyone regardless of subscription or account status.

In some implementations, the client device 102 presents the media content information to the user of the client device (618). In some implementations, the media content information is presented to a user on the display device 110 and/or the display 306. In some implementations, the media content information is presented in a graphical user interface as shown in FIG. 5. In some implementations, media content information includes information relating to media content instances from both remote and local sources.

In some implementations, the client device 102 determines the content sources that are accessible to the client device (604). In some implementations, the accessible content identification module 340 of the client device 102 determines accessible content sources. In some implementations, the client device 102 identifies one or more local content sources accessible to the client device (606). In some implementations, the client device 102 receives an indication from a respective one of the one or more applications that the respective remote content source associated with the respective application is accessible to the client device (608). For example, the accessible content identification module 340 may determine accessible local and/or remote content sources by communicating with one or more client-based applications associated with the content sources, scanning for accessible television channels, scanning and/or cataloguing local content databases, consulting stored data regarding accessible content sources, and the like.

In some implementations, the client device 102 performs local search functions, as described below in relation to steps (614) and (616). In some implementations, the client device 102 searches a local media information database, the search at least partially based on the media search query (614). For example, in some implementations, the client device 102 searches a local DVR, media server, hard drive, or the like.

In some implementations, the client device 102 identifies local media content information for at least one content instance stored on the local media information database (616). In some implementations, the local media sources include media content information for at least a subset of the media content instances stored thereon, such as title, genre, actors, ratings, etc. In some implementations, the local media sources store more or less information. Thus, in some implementations, the client device 102 acquires media content information for the local media content instances by referencing a database of media content information. For example, the client device 102 may identify a data file on a media server with a title "The Godfather," and then look up additional information relating to that media content instance based on the title. In some implementations, the client device 102 analyzes local media content instances to determine related media content information. For example, the client device 102 may extract data from an auxiliary data component of the media content instance, extract a watermark or embedded data from the media content instance, or generate a fingerprint of the media content instance and match the fingerprint against a database of reference fingerprints. In some implementations, the client device 102 then includes local media content information relating to locally stored content in the media content information that is presented to the user (618).

Figure 6B:
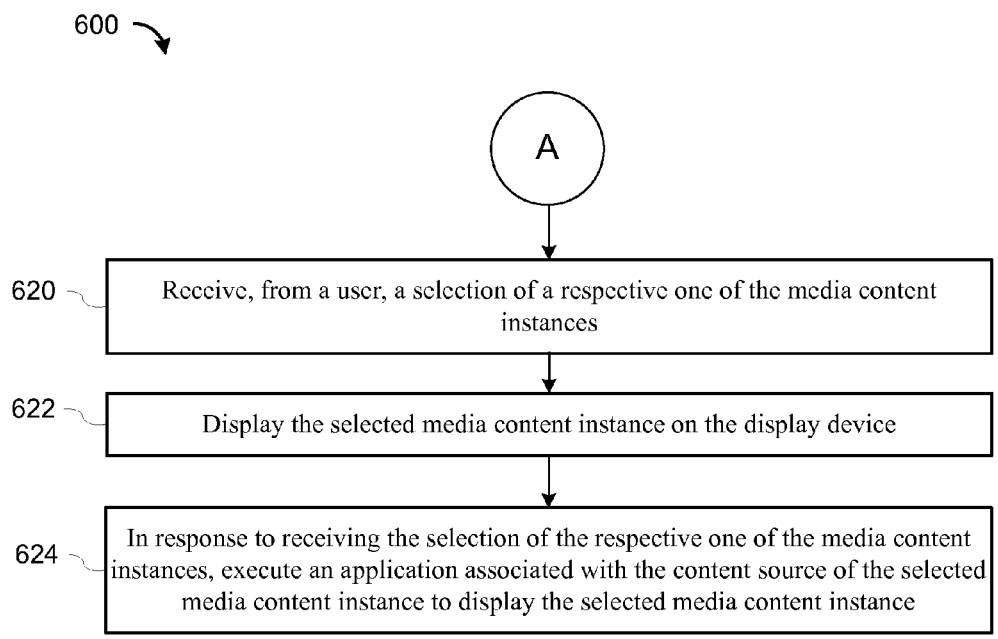

FIG. 6B illustrates additional aspects of the method 600, according to some implementations. In some implementations, the client device 102 receives, from a user, a selection of a respective one of the media content instances (620). In some implementations, the user selects a media content instance using an input device 122, such as a traditional remote control. In some implementations, the user selects a media content instance using the user interface 305 of the client device 102 (including, for example, a touchscreen input device).

In some implementations, the client device displays the selected media content instance on the display device (622). In some implementations, the display device is a television (e.g., the display device 110). In some implementations, the display device is a display integrated into the client device 102 (e.g., the display 303).

In some implementations, in response to receiving a selection of the respective one of the media content items, the client device 102 executes an application associated with the content source of the selected media content item to display the selected media content item (624). As described above, the client device 102 may display the selected media content instance using a media player 116 that is native to the client device 102. However, some content providers may require (for either technical or commercial reasons) that their content be displayed by or in conjunction with an application associated with them. For example, Netflix may use a proprietary video codec that cannot be played by the media player 116. Thus, the client device 102 will execute a Netflix application (that includes media playing functionality) to display a media content instance selected from Netflix.

Figure 7:
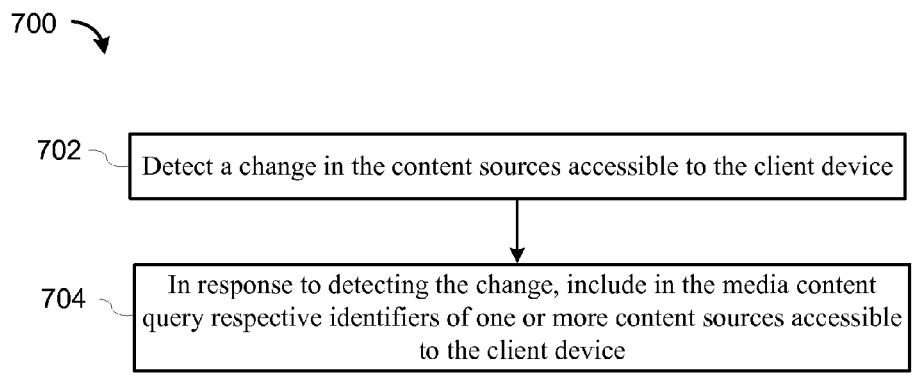
FIG. 7 illustrates a flowchart of a method for presenting media content information, according to some implementations.

FIG. 7 is a flowchart representing a method 700 for presenting media content information, according to some implementations. In some implementations, the method 700 is implemented in conjunction with the method 600 described above in order to manipulate the contents of the media content query based on events at the client device 102.

In some implementations, the client device 102 detects a change in the content sources accessible to the client device (702). A change in the accessible content sources occurs when a previously accessible content source becomes no longer accessible, or when a new content source has become accessible. In some implementations, the client device 102 detects a change by reference to the accessible content identification module 340. Changes may be instigated automatically, such as when a trial subscription expires, when a user fails to maintain a subscription or account in good standing, when a channel lineup for a user's subscription package is changed, and the like. Changes may also be instigated by manual input by a user, such as when a user adds subscription information to an account/billing management system of the client device 102, or downloads an application associated with a content source.

In some implementations, in response to detecting the change, the client device 102 includes in the media content query respective identifiers of one or more content sources accessible to the client device (704). Thus, the inclusion of identifiers of the accessible content sources occurs in response to detecting a change in the accessible content sources. However, in some implementations, identifiers of accessible content sources are included periodically and in response to detecting a change as described above. Further, in some implementations, the media content query includes respective identifiers of the accessible content sources each time the query is sent to the media information database.

Figure 8:
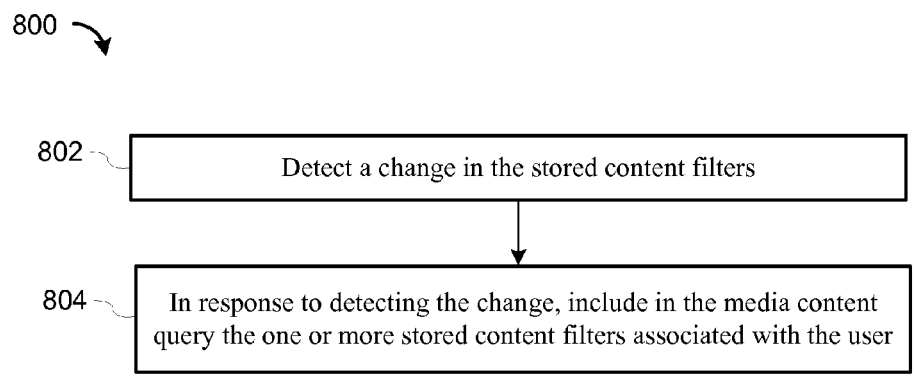
FIG. 8 illustrates a flowchart of a method for presenting media content information, according to some implementations.

FIG. 8 is a flowchart representing a method 800 for presenting media content information, according to some implementations. In some implementations, the method 800 is implemented in conjunction with the method 600 described above in order to manipulate the contents of the media content query based on events at the client device 102.

In some implementations, the client device 102 detects a change in the stored content filters (802). Stored content filters may be changed by a user, for example, when persistent device settings (such as parental controls, content filters, hardware limitations, etc.) are changed or updated.

In some implementations, in response to detecting the change, the client device includes in the media content query the one or more stored content filters (804). In some implementations, the client device 102 includes all the stored content filters in the media content query. In some implementations, the client device 102 includes only those content filters that have changed. The media information server 104 may then update stored information for a user and/or a client device to account for the change.

The methods described above may be governed by instructions that are stored in a computer readable storage medium and that are executed by one or more processors of one or more client devices. Each of the operations shown in FIGS. 6-8 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Each of the methods described herein may be governed by instructions that are stored in a computer readable storage medium and that are executed by one or more processors of one or more servers or clients. Each of the operations shown in FIG. 6 may correspond to instructions stored in a computer memory or computer readable storage medium.

The foregoing description, for purpose of explanation, has been described with reference to specific implementations. However, the illustrative discussions above are not intended to be exhaustive or to limit the disclosed ideas to the precise forms disclosed. Many modifications and variations are possible in view of the above teachings. The implementations were chosen and described in order to best explain the principles and practical applications of the disclosed ideas, to thereby enable others skilled in the art to best utilize them in various implementations with various modifications as are suited to the particular use contemplated.

Moreover, in the preceding description, numerous specific details are set forth to provide a thorough understanding of the presented ideas. However, it will be apparent to one of ordinary skill in the art that these ideas may be practiced without these particular details. In other instances, methods, procedures, components, and networks that are well known to those of ordinary skill in the art are not described in detail to avoid obscuring aspects of the ideas presented herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

What is claimed is:

1. A computer-implemented method for presenting media content information, comprising:
    at a client device having at least one processor and memory storing at least one program for execution by the at least one processor to perform:
        displaying a search query interface;
        receiving on the search query interface user inputs of keywords associated with one or more media content items in which the user is interested;
        generating a media search query based on the keywords associated with the one or more media content items, wherein the media content items include TV programs and/or movies available for viewing from a plurality of content sources, including subscription content sources that require for access user subscription and permission data of subscribers;
        determining locally at the client devices content sources that are accessible to the user of the client device;
        generating a media content query, the media content query including one or more keywords from the media search query and subscription and permission data for the content sources accessible to the user of the client device;
        sending to a media information database the generated media content query for identifying in the media information database a plurality of content instances accessible to the user of the client device based at least on the subscription and permission data for the content sources, wherein the media information database includes content information for content instances that are provided by the plurality of content sources, including content sources accessible and inaccessible to the user;
        in response to sending the media content query:
            receiving, from the media information database media content information for the plurality of content instances selected from a plurality of content types that satisfy the one or more keywords from the media search query;
            presenting on the search query interface a list of media content information items associated with the plurality of media instances provided by content sources accessible to the user of the client device; and
            enabling the user to select at least one of the plurality of content instances for display on the client device by an application associated with the content source of the selected media content instance.

2. The method of claim 1, further comprising determining the content sources that are accessible to the client device, by determining subscription and permission data for content sources accessible to the client device.

3. The method of claim 2, wherein determining the content sources that are accessible to the client device includes identifying one or more local content sources accessible to the client device.

4. The method of claim 1, further comprising:
    receiving, from the user, a selection of a respective one of the media content instance; and
    displaying the selected media content instance on the display device.

5. The method of claim 4, further comprising, in response to receiving the selection of the respective one of the media content instances, executing an application associated with the content source of the selected media content instance to display the selected media content instance.

6. The method of claim 1, wherein the media content information is presented on a display device associated with the client device.

7. The method of claim 6, wherein the media content information is displayed in a single context region of a user interface displayed on the display device.

8. The method of claim 1, wherein the media information database is remote from the client.

9. The method of claim 1, further comprising:
    searching a local media information database, the search at least partially based on the media search query;
    identifying local media content information for at least one content instances stored on the local media information database; and wherein presenting the media content information to the user includes presenting the local media content information.

10. The method of claim 9, wherein the local media information database is selected from the group consisting of: a digital video recorder, a media server, a hard drive, a desktop computer, and a laptop computer.

11. The method of claim 1, wherein the media content query includes respective identifiers of one or more content sources accessible to the client device.

12. The method of claim 1, further comprising:
    detecting a change of content sources accessible to the client device; and
    in response to detecting the change, including in the media content query respective identifiers of one or more content sources accessible to the client device.

13. The method of claim 1, wherein the media content query includes one or more content filters, and the received media content information satisfies the one or more content filters.

14. The method of claim 1, wherein the client device stores one or more content filters associated with the user, the method further comprising:
    detecting a change in the stored content filters; and
    in response to detecting the change, including in the media content query the one or more stored content filters.

15. The method of claim 1, wherein the media content query includes a user identifier of a user associated with the media content query.

16. The method of claim 13, wherein the one or more content filters are selected from the group consisting of: genre, video quality level, channel, content type, content source, cost, and rating.

17. The method of claim 1, wherein the content sources are selected from the group consisting of:
    a digital video recorder;
    a satellite radio channel;
    an over-the-air radio channel;
    an over-the-air television channel;
    a satellite television channel;
    a cable television channel;
    a cable music channel;
    an Internet Protocol television channel; and
    a streaming media service
    wherein each of the content source is associated with a respective application on the client device for playing its associated media content items.

18. A non-transitory computer readable storage medium storing at least one program configured for execution by at least one processor of a computer system, the at least one program comprising instructions to:
    display a search query interface;
    receive on the search query interface user inputs of keywords associated with one or more media content items in which the user is interested;
    generate a media search query based on the keywords associated with the one or more media content items, wherein the media content items include TV programs and/or movies available for viewing from a plurality of content sources, including subscription content sources that require for access user subscription and permission data of subscribers;
    determine locally at the client devices content sources that are accessible to the user of the client device;
    generate a media content query, the media content query including one or more keywords from the media search query and subscription and permission data for the content sources accessible to the user of the client device;
    send to a media information database the generated media content query for identifying in the media information database a plurality of content instances accessible to the user of the client device based at least on the subscription and permission data for the content sources, wherein the media information database includes content information for content instances that are provided by the plurality of content sources, including content sources accessible and inaccessible to the user;
    in response to sending the media content query:
        receive, from the media information database media content information for the plurality of content instances selected from a plurality of content types that satisfy the one or more keywords from the media search query;
        present on the search query interface a list of media content information items associated with the plurality of media instances provided by content sources accessible to the user of the client device; and
        enable the user to select at least one of the plurality of content instances for display on the client device by an application associated with the content source of the selected media content instance.

19. A system for identifying availability of media items, comprising:
    at least one processor;
    memory; and
    at least one program stored in the memory and executable by the at least one processor, the at least one program comprising instructions to:
        display a search query interface;
        receive on the search query interface user inputs of keywords associated with one or more media content items in which the user is interested;
        generate a media search query based on the keywords associated with the one or more media content items, wherein the media content items include TV programs and/or movies available for viewing from a plurality of content sources, including subscription content sources that require for access user subscription and permission data of subscribers;
        determine locally at the client devices content sources that are accessible to the user of the client device;
        generate a media content query, the media content query including one or more keywords from the media search query and subscription and permission data for the content sources accessible to the user of the client device;
        send to a media information database the generated media content query for identifying in the media information database a plurality of content instances accessible to the user of the client device based at least on the subscription and permission data for the content sources, wherein the media information database includes content information for content instances that are provided by the plurality of content sources, including content sources accessible and inaccessible to the user;
        in response to sending the media content query:
            receive, from the media information database media content information for the plurality of content instances selected from a plurality of content types that satisfy the one or more keywords from the media search query;

present on the search query interface a list of media content information items associated with the plurality of media instances provided by content sources accessible to the user of the client device; and
enable the user to select at least one of the plurality of content instances for display on the client device by an application associated with the content source of the selected media content instance.

20. A computer-implemented method for providing media content information, comprising:
at a server system including:
a media information server and a media information database with content information for content instances that are provided by a plurality of content sources, including subscription content sources that require for access user subscription and permission data of subscribers; and
at least one processor and memory storing at least one program for execution by the at least one processor to perform:
receiving from a client device a media content query including one or more keywords from a media search query and subscription and permission data for content sources accessible to a user of the client device, wherein the client device includes one or more applications each associated with a respective remote content source, and a search query interface for receiving user inputs of keywords associated with one or more media content items in which the user is interested, wherein the content sources that are accessible to the client device are determined at the client device based on the keywords and an indication from a respective one of the one or more applications that the respective remote content source associated with the respective application is accessible to the client device, and wherein the plurality of content sources associated with the media information database include content sources accessible and inaccessible to the user of the client device;
identifying in the media information database a plurality of content instances accessible to the user of the client device based at least on the subscription and permission data for the content sources;
obtaining media content information for the plurality of content instances selected from a plurality of content types that satisfy the one or more keywords from the media search query; and
providing to the client device media content information for the plurality of media instances provided by content sources accessible to the user of the client device, wherein the client device is configured to present on the search query interface a list of media content information items associated with the plurality of media instances provided by the content sources accessible to the user of the client device.

* * * * *